United States Patent
Altenbernd et al.

(10) Patent No.: US 7,088,736 B2
(45) Date of Patent: Aug. 8, 2006

(54) METHOD FOR BANDWIDTH RESERVATION IN DATA NETWORKS

(75) Inventors: Peter Altenbernd, Borchen (DE); Simon Schneider, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 927 days.

(21) Appl. No.: 09/995,927

(22) Filed: Nov. 27, 2001

(65) Prior Publication Data

US 2003/0067942 A1   Apr. 10, 2003

(30) Foreign Application Priority Data

Nov. 27, 2000   (EP) ................... 00125912

(51) Int. Cl.
*H04J 3/16* (2006.01)
*H04L 12/28* (2006.01)

(52) U.S. Cl. ................... 370/468; 370/230; 370/395.1; 370/395.4

(58) Field of Classification Search ................ 370/230, 370/230.1, 235, 253, 395.1, 395.4, 468, 477, 370/231

See application file for complete search history.

(56) References Cited

U.S. PATENT DOCUMENTS 5,289,462 A * 2/1994 Ahmadi et al. ............. 370/232

6,801,501 B1 * 10/2004 Knightly et al. ............ 370/233

OTHER PUBLICATIONS

Braden et al. "Resource Reservation Protocol", Sep. 1997, RFC 2205.*
R. Braden et al. "Resource Reservation Protocol", RFC 2205, Sep. 1997.
S. Shenker et al. "Specification of Guaranteed Quality of Service" RFC 2212, Sep. 1997.
L. Geogiadia et al., "Efficient Support of Delay and Rate Guarantees in an internet", SIGCOMM 1996, pp. 106-116.

* cited by examiner

*Primary Examiner*—Afsar Qureshi
(74) *Attorney, Agent, or Firm*—Bell, Boyd & Lloyd LLC

(57) ABSTRACT

A method for bandwidth reservation for transmitting source data of varying data rate in a data network in which a transmission quality determinable in advance can be reserved, having the features of: for the source data stream, source parameters in the form of a repetitive sequence of maximum volumes of data and associated times are determined; from these, a minimum bandwidth is determined by dividing the total volume of data by the total time per sequence; for a reserved bandwidth which is not smaller than the minimum bandwidth, a simulation is used to determine a buffer size and, optionally, a maximum bandwidth; and the bandwidth is reserved using the stream parameters determined in this way—minimum bandwidth, maximum bandwidth, buffer size and reserved bandwidth.

7 Claims, No Drawings

METHOD FOR BANDWIDTH RESERVATION IN DATA NETWORKS

BACKGROUND OF THE INVENTION

The present invention relates to bandwidth reservation in data networks, in particular for transmitting multimedia data in computer networks such as the Internet.

The Internet makes broad use of the connection-oriented protocol TCP/IP which, in turn, uses the underlying Internet Protocol, IP for short. IP, for its part, is a datagram protocol whose datagram property allows for it to be administered and scaled very easily and has, therefore, made an important contribution to the success of the Internet. However, a datagram protocol, such as IP, in particular, has the drawback that an assurance for a transmission is given neither generally nor in a particular volume of data in a particular time. This is called "best effort", on the basis of which each network node makes the best possible attempt to forward the data pockets, which dispenses with a guaranteed level of reliability. Where the latter is required, a protocol in the layer above, such as TCP/IP, therefore provides a reliable connection using repetitions, state messages and time sequences. For the majority of applications to date, this improvement is sufficient. Such an assurance is referred to as quality of service. Accordingly, TCP/IP provides the quality of service that the messages are actually received and are received in the order of sending so long as the underlying layer is actually working; i.e., the connection is not signaled as being faulty.

The transmission of telephony and, in particular, moving pictures requires a further quality for the transmission, however. In particular, this includes the data being transmitted within a particular time. In the knowledge of this maximum delay time, the receiver is able to set up an adequate buffer and, thus, to ensure smooth display of moving pictures.

This improvement in the transmission assurances in networks is examined under the headword "Quality of Service". As an overview combining the general knowledge of the person skilled in the art in this field, mention may be made of the book by P. Ferguson and G. Huston, "Quality of Service", Wiley & Sons 1998 (ISBN 0-471-24358-2).

To reserve such connections on the Internet, the protocol RSVP is provided, which is described in the document "Resource Reservation Protocol (RSVP)" by R. Braden et al., RFC 2205, September 1997. RSVP is responsible only for setting up the reservation. To specify the operating parts themselves, in this case the quality of service, RSVP in principle allows the use of a number of protocols; for example, the protocol described in the document "Specification of Guaranteed Quality of Service" by S. Shenker et al., RFC 2212, September 1997. This document describes the operating parts to be reserved using parameters of the "token bucket" model.

Studies in this area also have been published in the article "Efficient Support of Delay and Rate Guarantees in an Internet" by L. Georgiadis et al., SIGCOMM 1996, pp. 106–116. The "token bucket" model used therein was chosen as a largely unspecific model which is also intended to permit appropriate specification of data with a nonuniform data rate. Data with a nonuniform data rate are, in particular, video data compressed on the basis of MPEG2, where not only full key frames but also much smaller change frames are transmitted. In the absence of other rules, the reservation needs to be geared to the large key frames for such data streams.

It is an object of the present invention to make it possible to determine the parameters for reserving transport of, in particular, multimedia data in a better way than previously and to specify how the associated parameters are expediently interchanged.

SUMMARY OF THE INVENTION

To describe the multimedia data, the solution uses a repetitive sequence of frame sizes and their time intervals. From this sequence, the optimum parameters for reservation with RFC 2212 can be determined using simple analysis or simulation.

Accordingly, in an embodiment of the present invention, a method is provided for bandwidth reservation for transmitting source and data of varying data rate in a data network in which transmission quality determinable in advance can be reserved, wherein the method includes the steps of: determining for the source data stream, source parameters in the form of a repetitive sequence of maximum volumes of data and associated times; determining a minimum bandwidth from the source parameters by dividing a total volume of data by a total time per sequence; using a simulation, for a reserved bandwidth which is not smaller than the minimum bandwidth, to determine a buffer size and, optionally, a maximum bandwidth; and reserving the bandwidth using the determined stream parameters of the minimum bandwidth, the maximum bandwidth, the buffer size and the reserved bandwidth.

In an embodiment, the method further includes the step of converting source parameters available as a first sequence of block sizes and associated time intervals into a second sequence of transmitted volumes of data and respective time elapsed, and vice versa.

In an embodiment, for a series of transmitted volumes of data and associated times since the start of the sequence, the simulation subtracts from the volumes of data the respective product of instant and reserved bandwidth and outputs a maximum as the buffer size.

In an embodiment, the simulation forms quotients of block size and associated time intervals and outputs a maximum as the maximum bandwidth.

In an embodiment, the stream parameters are determined from the source parameters at a transmitter.

In an embodiment, the stream parameters are determined from the source parameters at a receiver.

In an embodiment, the stream parameters are determined from the source parameters at a transmission node located in a path between transmitter and receiver.

Additional features and advantages of the present invention are described in, and will be apparent from, the following Detailed Description of the Invention.

DETAILED DESCRIPTION OF THE INVENTION

The present invention is described below using an example for transmitting video data via digital connections between computers.

Video data generally include a series of frames which need to arise, be transmitted and be provided for reproduction at uniform intervals. In digital systems, the frames are preferably compressed at the transmitter by a factor of 10, for example. The method used in the MPEG standards relevant in this context corresponds to the JPEG method known for single frames. If only the single frames are compressed using JPEG, this is also referred to as M-JPEG.

The receiver decompresses the data and displays them on a screen. In this context, it is indispensable for the decompressed single frames to be available for display at uniform intervals again so that moving pictures do not "jolt". For this reason, a buffer is generally provided which normally stores a number of frames ready for retrieval. In terms of function, the buffer may be part of the data transmission device or may be provided by the display program.

To determine the buffer size, it is necessary to know the difference between the shortest and the longest delay between delivery of a frame by the transmitter and provision in the receiver. To simplify matters, the text below assumes that the shortest delay is zero, since the absolute delay is of little importance to the matters of concern here.

Provided that the data are to be transmitted using an IP protocol such as UDP, the problem is that they normally contain no specifications relating to execution times. This method of operation is called "best effort".

One of simplest measures is to guarantee a prescribed bandwidth, as is the case for an ISDN B-channel, for example. This method is appropriate for conventional video data, where each frame is compressed individually and is transmitted in the fixed time frame; the bandwidth required is simply the maximum compressed frame size divided by the interval between the frames. For typical television signals, a compressed frame size of 40 kbytes and an interval of 20 msecs are provided, which corresponds to a bandwidth of 2 Mbytes/sec. Video conferences, which use two bundled ISDN channels, for example, reduce the frame size and the frame rate to give 128 kbits/sec. This bandwidth is then also used continuously, however, so that the delay on the link varies little and is easy to predict. It should be pointed out that, with varying delays, the receiver requires a large buffer and can start reproduction only after the buffer has been filled, whereby a very noticeable delay arises in the case of video conferences. The introduction of video data compression based on the MPEG standard results in not only full (compressed) frames being transmitted, however, but also those which code only the differences between successive frames and are accordingly much smaller. By way of example, a typical succession includes eight frames at an interval of 20 msecs with the sizes 40 kbytes, three times 10 kbytes, one times 20 kbytes and three times 10 kbytes. The mean bandwidth is now just 120 kbytes per 160 msecs; that is to say, just 750 kbytes/sec. Although the mean bandwidth required is smaller, the maximum bandwidth of 2 Mbytes/sec determined by the largest frame needs to be reserved for transmission.

For ATM networks (asynchronous transfer mode), the article "Analysing Multimedia Traffic in Real-Time ATM Networks" by M. Sjödin and H. Hansson, Proc. 5th Real-Time Tech. and Appl. Symposium, RTAS'99 has therefore proposed a method which can be used at the nodes of an ATM network and can be used to reduce the bandwidth requirement in the case of a given characteristic of the multimedia data stream. However, this method is based on ATM networks in which virtual connections are set up and the data are fragmented by the network into very small units of 48 bytes, called cells.

As already mentioned above, extras have been specified for transmitting video data using IP protocols. These extras include a protocol which can be used to stipulate a data transmission path in the network such that guaranteed, i.e. predetermined and specified, delivery of transmitted data is ensured. This is the "Resource Reservation Protocol", RSVP for short, which is described in the document RFC 2205 (Braden et al., 1997) already cited above. With RSVP, the transmitter of a data stream transmits a message via the network to the receiver (or receivers). This message contains a specification of the quality of service required and at the same time determines a path through the network from the transmitter to the receiver. The receiver responds with complemented or modified parameters and, when this message arrives at the transmitter as intended, obtains a reserved path having guaranteed transmission properties. To describe the quality of service, QoS for short, RSVP allows various specifications; for example, that in accordance with RFC 2212 (Shenker et al., Specification of Guaranteed Quality of Service, 1997).

When using FRC 2212 to describe the quality of service, a quasi-continuous model is used which is called the "token bucket model". In this case, there is a buffer which is emptied at least using the reserved bandwidth. The buffer can be filled at a relatively high data rate, with the mean data rate naturally not being able to be above the data rate specified for emptying; i.e., the reserved bandwidth. The description of the quality of service on the basis of the "token bucket model" has the advantage that it is independent of the implementation of the switching nodes.

The RFC 2212 cites five parameters to be specified by the receiver setting up the connection. These are:

r: the mean bandwidth (token bucket rate)
R: the reserved bandwidth
b: the buffer size (token bucket depth)
p: the maximum bandwidth (peak rate)
M: the maximum packet size This then guarantees a maximum delay of $$d = \frac{120k - 40k}{1000k} \cdot 0.8 + \frac{40k}{1000k} = (64 + 40) \text{ m sec} = 104 \text{ m sec}.$$

For the example cited above, the mean bandwidth obtained is r=750 kbytes/sec and the peak bandwidth obtained is p=2000 kbytes/sec. The reserved bandwidth R must in all cases be greater than or equal to the mean bandwidth; thus, by way of example, a bandwidth of R=1000 kbytes/sec may need to be reserved. The factor $$\frac{p - R}{p - r}$$

thus gives 0.8.

Two variables, namely b and M, remain to be defined. M obviously needs to be chosen to be 40 kbytes, since this is the largest frame. Space for all eight frames is provided as the buffer, that is to say b=120 kbytes. In that case, $$b = \frac{120k - 40k}{1000k} \cdot 0.8 + \frac{40k}{1000k} = (64 + 40)\text{m sec} = 104\text{m sec}$$

is obtained.

With this choice of these parameters, the receiver therefore needs to provide a buffer for six frames.

For the rest, the mean bandwidth is at the same time the smallest bandwidth or minimum bandwidth, since it is not possible to accumulate data which have not yet been transmitted.

However, it is possible to determine the parameters within much narrower limits and, thus, both to reduce the delay and to achieve better utilization of the network.

In this context, the data stream used as an example above is represented as a tuple (40 k, 10 k, 10 k, 10 k, 20 k, 10 k, 10 k, 10 k) together with the frame interval of 20 ms. This tuple describes a sequence of data blocks which is repetitive; i.e., is repeated cyclically. The maximum data rate is obtained unchanged as the quotient of the size of the largest block and the frame interval. Equally unchanged, the minimum bandwidth is the sum of the block sizes divided by the total duration of the sequence.

Determination of the buffer size now takes into account the fact that the data are forwarded at least using the reserved bandwidth R, and no buffer is required for the forwarded data. A simulation therefore determines the respectively required buffer size in the following manner:

first, the sequence details are accumulated into a succession in which the transmitted volumes of data are assigned to the respective time which has passed.

This table then has the following appearance for the example:

| 00 ms | 40 k |
| 20 ms | 50 k |
| 40 ms | 60 k |
| 60 ms | 70 k |
| 80 ms | 90 k |
| 100 ms | 100 k |
| 120 ms | 110 k |
| 140 ms | 120 k |

Each row is obtained from the previous one by addition of the respective time difference, which is constant in this example, and the respective block size, the size of the first block actually appearing in the first row at the instant 0. A further column is now added which determines the volume of data already transmitted for the bandwidth R which is to be reserved, and the volume of data is subtracted from the received volume of data in the fourth column:

| 00 ms | 40 k | 0 | 40 k |
| 20 ms | 50 k | 20 k | 30 k |
| 40 ms | 60 k | 40 k | 20 k |
| 60 ms | 70 k | 60 k | 10 k |
| 80 ms | 90 k | 80 k | 10 k |
| 100 ms | 100 k | 100 k | 0 |
| 120 ms | 110 k | 120 k | 0 |
| 40 ms | 120 k | 140 k | 0 |

For this example, one buffer is found to be sufficient for the first largest block; that is to say, b=40 kbytes. The following is then obtained:

$$b = \frac{40000 - 40000}{1000} \cdot 0.8 + \frac{40000}{1000} = 0 + 40 = 40 \text{m sec};$$

that is to say, a much smaller assured delay.

In most cases, however, a block size of 40 kbytes is not admissible. The relevant detail in this instance is the maximum transmission unit, MTU. In local area networks, such as Ethernet, this is normally approximately 1 kbyte. To make the subsequent examples easier to understand, a block size of 8 kbytes will be used instead.

The first block of 40 kbytes is expediently split into 5 blocks of 8 kbytes in the transmitter. This then results in a correspondingly shorter time interval of 4 msecs per block. The above table is then obtained as follows:

| 00 ms | 8 k | 0 | 8 k |
| 04 ms | 16 k | 4 k | 12 k |
| 08 ms | 24 k | 8 k | 16 k |
| 12 ms | 32 k | 12 k | 20 k |
| 16 ms | 40 k | 16 k | 24 k |
| 20 ms | 48 k | 20 k | 24 k |
| 24 ms | 50 k | 24 k | 26 k |
| 28 ms | 50 k | 28 k | 22 k |
| 32 ms | 50 k | 32 k | 18 k |
| 36 ms | 50 k | 36 k | 14 k |
| 40 ms | 58 k | 40 k | 18 k |
| 44 ms | 60 k | 44 k | 16 k |
| 48 ms | 60 k | 48 k | 12 k |

For the sake of clarity, the other rows have been omitted. A buffer of 26 kbytes is found to be sufficient.

Hence, b=26 k and M=8 k are obtained; the assured maximum delay is reduced to $$d = \frac{40000 - 40000}{1000} \cdot 0.8 + \frac{40000}{1000} = 0 + 40 \text{ m sec};$$

i.e., in the order of magnitude of an additional frame.

A prerequisite in this context is that the transmitter or the network software in the transmitter also sends the packets in the provided interval of 4 ms.

If this tight condition is to be alleviated and the interval is to be reduced to 2 msec, but the block size of 8 kbytes is to be retained, the following simulation is obtained:

| 00 ms | 8 k | 0 | 8 k |
| 02 ms | 16 k | 2 k | 14 k |
| 04 ms | 24 k | 4 k | 20 k |
| 06 ms | 32 k | 6 k | 26 k |
| 08 ms | 40 k | 8 k | 32 k |
| 10 ms | 40 k | 10 k | 30 k |
| 12 ms | 40 k | 12 k | 28 k |
| 14 ms | 40 k | 14 k | 26 k |
| 16 ms | 40 k | 16 k | 24 k |
| 18 ms | 40 k | 18 k | 22 k |
| 20 ms | 48 k | 20 k | 28 k |
| 22 ms | 50 k | 22 k | 28 k |
| 24 ms | 50 k | 24 k | 26 k |

The buffer size is determined by the simulation to be 32 kbytes. The maximum bandwidth is doubled to p=4000 kbytes/sec; the factor $$\frac{p - R}{p - r}$$

becomes 0.93. For the delay at b=32 k, the following is then obtained:

$$b = \frac{26k - 8k}{1000k} \cdot 0.8 + \frac{8k}{1000k} = (18 \cdot 0.93 + 8) \text{ m sec} = 24 \text{ m sec};$$

Obviously, the simulation is able to ascertain the correct buffer size for a large number of variants.

It is admissible to specify an "infinitely" large maximum bandwidth; this produces the factor $$\frac{p-R}{p-r} \approx 1 \text{ and } d = \frac{b}{R}$$

The assured maximum delay now depends only on the buffer size and becomes shorter the smaller the buffer size is. It easily can be determined by the simulation.

On the basis of the RSVP protocol, the receiver determines the bandwidth to be reserved by specifying the bandwidth which is to be reserved and the buffer size. Hence, the source parameters are preferably transmitted from the transmitter to the receiver, and the simulation is performed at the latter. In RSVP, transmission of such additional data is provided. Alternatively, the transmitter may actually perform such a simulation in order to select bandwidths which are to be received and may then transmit a selection of bandwidth and buffer size, based on a block size and minimum interval between the blocks, to the receiver. This is possible either within the context of RSVP using other data or via a further network connection.

It is also possible for the network nodes to access the source parameters transmitted using RSVP and then to ascertain the buffer requirement themselves using a simulation. This is important particularly when the data streams are reshaped at the network nodes. By way of example, a different transmission medium is used between the network nodes than from the transmitter and to the receiver. It is then possible to determine the buffer required using a simulation when setting up the connection for the network nodes.

Although the present invention has been described with reference to specific embodiments, those of skill in the art will recognize that changes may be made thereto without departing from the spirit and scope of the invention as set forth in the hereafter appended claims.

The invention claimed is:

1. A method for bandwidth reservation for transmitting source data of a varying data rate in a data network in which a transmission quality determinable in advance can be reserved, the method comprising the steps of:
   determining source parameters, for the source data stream, in the form of a repetitive sequence of maximum volumes of data and associated times;
   determining a minimum bandwidth from the source parameters by dividing a total volume of data by a total time per sequence;
   using a simulation, for a reserved bandwidth which is not smaller than the minimum bandwidth, to determine a buffer size and, optionally, a maximum bandwidth; and
   reserving the operating bandwidth using the determined stream parameters of the minimum bandwidth, the maximum bandwidth, the buffer size and the reserved bandwidth.

2. A method for bandwidth reservation as claimed in claim 1, the method further comprising the step of converting source parameters available as a first sequence of block sizes and associated time intervals into a second sequence of transmitted volumes of data and respective time elapsed, and vice versa.

3. A method for bandwidth reservation as claimed in claim 1, wherein, for a series of transmitted volumes of data and associated times since the start of the sequence, the simulation subtracts from the volumes of data a respective product of instant and reserved bandwidth and outputs a maximum as the buffer size.

4. A method for bandwidth reservation as claimed in claim 1, wherein the simulation forms quotients of block size and associated time intervals and outputs a maximum as the maximum bandwidth.

5. A method for bandwidth reservation as claimed in claim 1, wherein the stream parameters are determined from the source parameters at a transmitter.

6. A method for bandwidth reservation as claimed in claim 1, wherein the stream parameters are determined from the source parameters at a receiver.

7. A method for bandwidth reservation as claimed in claim 1, wherein the stream parameters are determined from the source parameters at a transmission node located in a path between transmitter and receiver.

* * * * *